United States Patent
Tuck et al.

(10) Patent No.: US 10,324,725 B2
(45) Date of Patent: Jun. 18, 2019

(54) FAULT DETECTION IN INSTRUCTION TRANSLATIONS

(71) Applicant: Nvidia Corporation, Santa Clara, CA (US)

(72) Inventors: Nathan Tuck, Santa Clara, CA (US); David Dunn, Santa Clara, CA (US); Ross Segelken, Santa Clara, CA (US); Madhu Swarna, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 15/915,975

(22) Filed: Mar. 8, 2018

(65) Prior Publication Data

US 2018/0260222 A1 Sep. 13, 2018

Related U.S. Application Data

(63) Continuation of application No. 13/728,669, filed on Dec. 27, 2012, now abandoned.

(51) Int. Cl.
*G06F 9/30* (2018.01)
*G06F 11/07* (2006.01)

(52) U.S. Cl.
CPC ........ *G06F 9/3017* (2013.01); *G06F 11/0721* (2013.01); *G06F 11/0793* (2013.01)

(58) Field of Classification Search
CPC .................................................. G06F 9/3017
See application file for complete search history.

(56) References Cited

U.S. PATENT DOCUMENTS

| | | | |
|---|---|---|---|
| 3,815,101 | A | 6/1974 | Boss et al. |
| 3,950,729 | A | 4/1976 | Fletcher et al. |
| 4,654,790 | A | 3/1987 | Woffinden |
| 4,797,814 | A | 1/1989 | Brenza |
| 4,812,981 | A | 3/1989 | Chan et al. |
| 5,123,094 | A | 6/1992 | MacDougall |

(Continued)

FOREIGN PATENT DOCUMENTS

| | | |
|---|---|---|
| CN | 1390329 | 1/2003 |
| CN | 1519728 | 8/2004 |

(Continued)

OTHER PUBLICATIONS

Rozas, Guillermo J. et al., "Queued Instructions Re-Dispatch After Runahead," U.S. Appl. No. 13/730,407, filed Dec. 28, 2012, 36 pages.

(Continued)

*Primary Examiner* — Aimee Li
*Assistant Examiner* — William V Nguyen (57) ABSTRACT

The disclosure provides a method and a system for identifying and replacing code translations that generate spurious fault events. In one embodiment the method includes executing a first set and a second set of native instructions, performing a third translation of a target instruction to form a third set of native instructions in response to a determination that a fault occurrence is attributed to a first translation, wherein the third set of native instructions is not the same as the second set of native instructions, and the third set of native instructions is not the same as the first set of native instructions, and executing the third set of native instructions.

16 Claims, 3 Drawing Sheets

(56) References Cited

U.S. PATENT DOCUMENTS

| | | | |
|---|---|---|---|
| 5,179,669 A | 1/1993 | Peters | |
| 5,245,702 A | 9/1993 | McIntyre et al. | |
| 5,278,962 A | 1/1994 | Masuda et al. | |
| 5,414,824 A | 5/1995 | Grochowski | |
| 5,446,854 A | 8/1995 | Khalidi et al. | |
| 5,487,146 A | 1/1996 | Gutlag et al. | |
| 5,526,504 A | 6/1996 | Hsu et al. | |
| 5,649,102 A | 7/1997 | Yamauchi et al. | |
| 5,649,184 A | 7/1997 | Hayashi et al. | |
| 5,696,925 A | 12/1997 | Koh | |
| 5,721,855 A | 2/1998 | Hinton et al. | |
| 5,870,582 A | 2/1999 | Cheong et al. | |
| 5,949,785 A | 9/1999 | Beasley | |
| 5,956,753 A | 9/1999 | Glew et al. | |
| 5,963,984 A | 10/1999 | Garibay, Jr. et al. | |
| 5,999,189 A | 12/1999 | Kajiya et al. | |
| 6,012,132 A | 1/2000 | Yamada et al. | |
| 6,031,992 A | 2/2000 | Cmelik et al. | |
| 6,091,897 A | 7/2000 | Yates et al. | |
| 6,091,987 A | 7/2000 | Thompson | |
| 6,118,724 A | 9/2000 | Higginbottom | |
| 6,297,832 B1 | 10/2001 | Mizuyabu et al. | |
| 6,298,390 B1 | 10/2001 | Matena et al. | |
| 6,362,826 B1 | 3/2002 | Doyle et al. | |
| 6,457,115 B1 | 9/2002 | McGrath | |
| 6,470,428 B1 | 10/2002 | Milway et al. | |
| 6,499,090 B1 | 12/2002 | Hill et al. | |
| 6,519,694 B2 | 2/2003 | Harris | |
| 6,549,997 B2 | 4/2003 | Kalyanasundharam | |
| 6,636,223 B1 | 10/2003 | Morein | |
| 6,658,538 B2 | 12/2003 | Arimilli et al. | |
| 6,711,667 B1 | 3/2004 | Ireton | |
| 6,714,904 B1 | 3/2004 | Torvalds et al. | |
| 6,742,104 B2 | 5/2004 | Chauvel et al. | |
| 6,813,699 B1 | 11/2004 | Belgard | |
| 6,823,433 B1 | 11/2004 | Barnes et al. | |
| 6,839,813 B2 | 1/2005 | Chauvel | |
| 6,859,208 B1 | 2/2005 | White | |
| 6,877,077 B2 | 4/2005 | McGee et al. | |
| 6,883,079 B1 | 4/2005 | Priborsky | |
| 6,950,925 B1 | 9/2005 | Sander et al. | |
| 6,978,642 B2 | 12/2005 | Adler et al. | |
| 6,981,083 B2 | 12/2005 | Arimilli et al. | |
| 7,007,075 B1 | 2/2006 | Coffey | |
| 7,010,648 B2 | 3/2006 | Kadambi et al. | |
| 7,062,631 B1 | 6/2006 | Klaiber et al. | |
| 7,082,508 B2 | 7/2006 | Khan et al. | |
| 7,107,411 B2 | 9/2006 | Burton et al. | |
| 7,107,441 B2 | 9/2006 | Zimmer et al. | |
| 7,117,330 B1 | 10/2006 | Alverson et al. | |
| 7,120,715 B2 | 10/2006 | Chauvel et al. | |
| 7,124,327 B2 | 10/2006 | Bennett et al. | |
| 7,139,876 B2 | 11/2006 | Hooker | |
| 7,159,095 B2 | 1/2007 | Dale et al. | |
| 7,162,612 B2 | 1/2007 | Henry et al. | |
| 7,191,349 B2 | 3/2007 | Kaushik et al. | |
| 7,194,597 B2 | 3/2007 | Willis et al. | |
| 7,194,604 B2 | 3/2007 | Bigelow et al. | |
| 7,203,932 B1 | 4/2007 | Gaudet et al. | |
| 7,225,355 B2 | 5/2007 | Yamazaki et al. | |
| 7,234,038 B1 | 6/2007 | Durrant | |
| 7,275,246 B1 | 9/2007 | Yates, Jr. et al. | |
| 7,310,722 B2 | 12/2007 | Moy et al. | |
| 7,340,582 B2 | 3/2008 | Madukkarumukumana et al. | |
| 7,340,628 B2 | 3/2008 | Pessolano | |
| 7,401,358 B1 | 7/2008 | Christie et al. | |
| 7,406,585 B2 | 7/2008 | Rose et al. | |
| 7,447,869 B2 | 11/2008 | Kruger et al. | |
| 7,451,300 B1* | 11/2008 | Anvin | G06F 9/30181 712/244 |
| 7,516,453 B1* | 4/2009 | Bugnion | G06F 9/45504 712/227 |
| 7,519,781 B1 | 4/2009 | Wilt | |
| 7,545,382 B2 | 6/2009 | Montrym et al. | |
| 7,702,843 B1 | 4/2010 | Chen et al. | |
| 7,730,489 B1 | 6/2010 | Duvur et al. | |
| 7,752,627 B2 | 7/2010 | Jones et al. | |
| 7,873,793 B1 | 1/2011 | Rozas et al. | |
| 7,890,735 B2 | 2/2011 | Tran | |
| 7,921,300 B2 | 4/2011 | Crispin et al. | |
| 7,925,923 B1 | 4/2011 | Hyster et al. | |
| 8,035,648 B1 | 10/2011 | Wloka et al. | |
| 8,190,863 B2 | 5/2012 | Fossum et al. | |
| 8,364,902 B2 | 1/2013 | Hooker et al. | |
| 8,533,437 B2 | 9/2013 | Henry et al. | |
| 8,549,504 B2 | 10/2013 | Breternitz, Jr. et al. | |
| 8,621,120 B2 | 12/2013 | Bender et al. | |
| 8,706,975 B1 | 4/2014 | Glasco et al. | |
| 8,707,011 B1 | 4/2014 | Glasco et al. | |
| 8,762,127 B2 | 6/2014 | Winkel et al. | |
| 9,384,001 B2 | 7/2016 | Hertzberg et al. | |
| 9,547,602 B2 | 1/2017 | Klaiber et al. | |
| 2001/0049818 A1 | 12/2001 | Banerjia et al. | |
| 2002/0004823 A1 | 1/2002 | Anderson et al. | |
| 2002/0013889 A1 | 1/2002 | Schuster et al. | |
| 2002/0099930 A1 | 7/2002 | Sakamoto et al. | |
| 2002/0108103 A1 | 8/2002 | Nevill | |
| 2002/0169938 A1 | 11/2002 | Scott et al. | |
| 2002/0172199 A1 | 11/2002 | Scott et al. | |
| 2003/0014609 A1 | 1/2003 | Kissell | |
| 2003/0018685 A1 | 1/2003 | Kalafatis et al. | |
| 2003/0033507 A1 | 2/2003 | McGrath | |
| 2003/0120892 A1 | 6/2003 | Hum et al. | |
| 2003/0140245 A1 | 7/2003 | Dahan et al. | |
| 2003/0167420 A1 | 9/2003 | Parsons | |
| 2003/0172220 A1 | 9/2003 | Hao | |
| 2003/0196066 A1 | 10/2003 | Mathews | |
| 2003/0236771 A1 | 12/2003 | Becker | |
| 2004/0025161 A1 | 2/2004 | Chauvel et al. | |
| 2004/0054833 A1 | 3/2004 | Seal et al. | |
| 2004/0078778 A1 | 4/2004 | Leymann et al. | |
| 2004/0122800 A1 | 6/2004 | Nair et al. | |
| 2004/0128448 A1 | 7/2004 | Stark et al. | |
| 2004/0153350 A1 | 8/2004 | Kim et al. | |
| 2004/0168042 A1 | 8/2004 | Lin | |
| 2004/0193831 A1 | 9/2004 | Moyer | |
| 2004/0215918 A1 | 10/2004 | Jacobs et al. | |
| 2004/0225869 A1 | 11/2004 | Pagni et al. | |
| 2004/0268071 A1 | 12/2004 | Khan et al. | |
| 2005/0050013 A1 | 3/2005 | Ferlitsch | |
| 2005/0055533 A1 | 3/2005 | Kadambi et al. | |
| 2005/0086650 A1 | 4/2005 | Yates, Jr. et al. | |
| 2005/0097276 A1 | 5/2005 | Lu et al. | |
| 2005/0097280 A1 | 5/2005 | Hofstee et al. | |
| 2005/0138332 A1 | 6/2005 | Kottapalli et al. | |
| 2005/0154831 A1 | 7/2005 | Steely, Jr. et al. | |
| 2005/0154867 A1 | 7/2005 | DeWitt, Jr. et al. | |
| 2005/0207257 A1 | 9/2005 | Skidmore | |
| 2005/0268067 A1 | 12/2005 | Lee et al. | |
| 2006/0004984 A1 | 1/2006 | Morris et al. | |
| 2006/0010309 A1 | 1/2006 | Chaudhry et al. | |
| 2006/0069879 A1 | 3/2006 | Inoue et al. | |
| 2006/0069899 A1 | 3/2006 | Schoinas et al. | |
| 2006/0095678 A1 | 5/2006 | Bigelow et al. | |
| 2006/0149931 A1 | 7/2006 | Haitham et al. | |
| 2006/0174228 A1 | 8/2006 | Radhakrishnan et al. | |
| 2006/0187945 A1 | 8/2006 | Andersen | |
| 2006/0190671 A1 | 8/2006 | Jeddeloh | |
| 2006/0195683 A1 | 8/2006 | Kissell | |
| 2006/0230223 A1 | 10/2006 | Kruger et al. | |
| 2006/0259732 A1 | 11/2006 | Traut et al. | |
| 2006/0259744 A1 | 11/2006 | Matthes | |
| 2006/0259825 A1 | 11/2006 | Cruickshank et al. | |
| 2006/0277398 A1 | 12/2006 | Akkary et al. | |
| 2006/0282645 A1 | 12/2006 | Tsien | |
| 2006/0288174 A1 | 12/2006 | Nace et al. | |
| 2007/0067505 A1 | 3/2007 | Kaniyur et al. | |
| 2007/0073996 A1 | 3/2007 | Kruger et al. | |
| 2007/0106874 A1 | 5/2007 | Pan et al. | |
| 2007/0126756 A1 | 6/2007 | Glasco et al. | |
| 2007/0157001 A1 | 7/2007 | Ritzau | |
| 2007/0168634 A1 | 7/2007 | Morishita et al. | |
| 2007/0168643 A1 | 7/2007 | Hummel et al. | |
| 2007/0204137 A1 | 8/2007 | Tran | |

(56) References Cited

U.S. PATENT DOCUMENTS

| | | |
|---|---|---|
| 2007/0234358 A1 | 10/2007 | Hattori et al. |
| 2007/0240141 A1 | 10/2007 | Qin et al. |
| 2008/0141011 A1 | 6/2008 | Zhang et al. |
| 2008/0172657 A1 | 7/2008 | Bensal et al. |
| 2008/0263284 A1 | 10/2008 | da Silva et al. |
| 2009/0019317 A1 | 1/2009 | Quach et al. |
| 2009/0204785 A1 | 8/2009 | Yates, Jr. et al. |
| 2009/0327661 A1 | 12/2009 | Sperber et al. |
| 2009/0327673 A1 | 12/2009 | Yoshimatsu et al. |
| 2010/0161901 A9 | 6/2010 | Williamson et al. |
| 2010/0205402 A1 | 8/2010 | Henry et al. |
| 2010/0205415 A1 | 8/2010 | Henry et al. |
| 2010/0217936 A1 | 8/2010 | Carmichael |
| 2010/0306503 A1 | 12/2010 | Henry et al. |
| 2011/0078425 A1 | 3/2011 | Shah et al. |
| 2011/0153307 A1 | 6/2011 | Winkel et al. |
| 2011/0307876 A1 | 12/2011 | Ottoni et al. |
| 2012/0023359 A1 | 1/2012 | Edmeades et al. |
| 2012/0089819 A1 | 4/2012 | Chaudhry et al. |
| 2012/0198157 A1 | 8/2012 | Abdallah |
| 2013/0198458 A1 | 8/2013 | Winkel et al. |
| 2013/0219370 A1 | 8/2013 | Beale et al. |
| 2013/0246709 A1 | 9/2013 | Segelken et al. |
| 2013/0275684 A1 | 10/2013 | Tuck et al. |
| 2013/0311752 A1 | 11/2013 | Brauch et al. |
| 2014/0019723 A1 | 1/2014 | Yamada et al. |
| 2014/0052962 A1 | 2/2014 | Hertzberg et al. |
| 2014/0082291 A1 | 3/2014 | Van Zoeren et al. |
| 2014/0136891 A1 | 5/2014 | Holmer et al. |
| 2014/0189310 A1 | 7/2014 | Tuck et al. |
| 2014/0281259 A1 | 9/2014 | Klaiber et al. |
| 2014/0281392 A1 | 9/2014 | Tuck et al. |
| 2015/0026443 A1 | 1/2015 | Kumar et al. |

FOREIGN PATENT DOCUMENTS

| | | |
|---|---|---|
| CN | 1629799 | 6/2005 |
| CN | 1682181 | 10/2005 |
| CN | 1823322 | 8/2006 |
| CN | 1831757 | 9/2006 |
| CN | 101042670 | 9/2007 |
| CN | 101110074 | 1/2008 |
| CN | 100378618 C | 4/2008 |
| CN | 101984403 | 3/2011 |
| CN | 102110011 | 6/2011 |
| DE | 102013218370 | 3/2014 |
| EP | 0671718 | 9/1995 |
| EP | 1557754 | 7/2005 |
| GB | 2287111 | 9/1995 |
| GB | 2404043 | 1/2005 |
| GB | 2404044 | 1/2005 |
| JP | 02288927 | 11/1990 |
| JP | 03054660 | 3/1991 |
| JP | 04182858 | 6/1992 |
| TW | I233545 | 12/1992 |
| TW | 200401187 | 1/2004 |
| TW | I232372 | 5/2005 |
| TW | 200537886 | 11/2005 |
| TW | I263938 | 10/2006 |
| TW | I275938 | 3/2007 |
| TW | 200723111 | 6/2007 |
| TW | I282230 | 6/2007 |
| TW | I284281 | 7/2007 |
| TW | 200809514 | 2/2008 |
| TW | I1309378 | 5/2009 |
| TW | I315846 | 10/2009 |
| TW | I1315488 | 10/2009 |
| TW | 201106264 | 2/2011 |
| TW | 201135460 | 10/2011 |
| TW | 201220183 | 5/2012 |
| TW | I425418 | 2/2014 |
| WO | 2012103209 | 8/2012 |

OTHER PUBLICATIONS

Adve, S. et al., "Shared Memory Consistence models: A Turorial", WRL Research Report 95/7, Western Digital Laboratory, Sep. 1995, 32 pages.

Chaudhuri, "The impact of NACKs in shared memory scientific applications", Feb. 2004, IEEE, IEEE Transactions on Parallel and distributed systems vol. 15, No. 2, p. 134-150.

Chaudry, S. et al., "High-Performance Throughput Computing," Micro, IEEE 25.3, pp. 32-45, May 2005, 14 pages.

Dehnert, et al., "The Transmeta Code MorphingTM Software: Using Speculation, Recovery, and Adaptive Retranslation to Address Real-Life Challenges," Mar. 23, 2003, IEEE, CGO'03 Proceedings of the International Symposium on Code generation and optimization: feedback-directed and runtime optimization, pp. 15-24.

Dundas, J. et al., "Improving Date Cache Performance by Pre-executing Instructions Under a Cache Miss", Proceedings of the 1997 International Conference on Supercomputing, Jul. 1997, 9 pages.

Ekman, M., et al., "Instruction Categorization for Runahead Operation", U.S. Appl. No. 13/708,544, filed Dec. 7, 2012, 32 pages.

Ekman, M., et al., "Selective Poisoning of Data During Runahead", U.S. Appl. No. 13/662,171, filed Oct. 26, 2012, 33 pages.

Holmer, B., et al., "Managing Potentially Invalid Results During Runahead", U.S. Appl. No. 13/677,085, filed Nov. 14, 2012, 29 pages.

Laibinis, "Formal Development of Reactive Fault Tolerant Systems", Sep. 9, 2005, Springer, Second International Workshop, RISE 2005, p. 234-249.

Mutlu, O., et al., "Runahead Execution: An Alternative to Very large Instruction Windows for Out-of-order Processors," This paper appears in: "High-Performance Computer Architecture," Feb. 8-12, 2003, 13 pages.

Wikipedia, Physical Address, Apr. 17, 2010, pp. 1-2, www.wikipedia.com.

Osronline, (The Basics: So what is a Page fault?), http://www.osronline.com/article.cfm?article=222, May 5, 2003, p. 1-2.

PC Magazine (Definition of: Page Fault) PCMag.com, Mar. 27, 2009.

Rotenberg, et al., "A Trace Cache Microarchitecture and Evaluation," IEEE Transactions on Computers, vol. 48, No. 2, Feb. 1999, 10 pages.

Rotenberg, et al., "Trace Cache: a Low Latency Approach to High Bandwidth Instruction Fetching," Proceedings of the 29th Annual International Symposium on Microarchitecture, Dec. 2-4, 1996, Paris, France, IEEE, 12 pages.

Rotenberg, et al., "Trace Cache: a Low Latency Approach to High Bandwidth Instruction Fetching," <http://people.engr.ncsu.edu/ericro/publications/techreport_MICRO-29_rbs.pdf>, Apr. 11, 1996, 48 pages.

Rozas, J., et al., "Lazy Runahead Operation for a Microprocessor", U.S. Appl. No. 13/708,645, filed Dec. 7, 2012, 32 pages.

Shalan, (Dynamic Memory Management for embedded real-time multiprocessor system on a chip), 2000, ACM, 180-186.

Shalan, (Dynamic Memory Management for embedded real-time multiprocessor system on a chip), 2003, Georgia Inst. of Tech., 1-118.

Wikipedia article, "Instruction Prefetch," https://en.wikipedia.org/wiki/instruction_prefetch, downloaded May 23, 2016.

Wikipedia article, "x86," https://en.wikipedia.org/wiki/X86, downloaded May 23, 2016.

Wikipedia, (CPU Cache definition), Wikipedia, Jan. 26, 2010, pp. 1-16.

Wikipedia, (Page Fault definition), Wikipedia, Mar. 9, 2009, pp. 1-4.

Wikipedia, Memory Address, Oct. 29, 2010, pp. 1-4, www.wikipedia.com.

\* cited by examiner

FAULT DETECTION IN INSTRUCTION TRANSLATIONS

CROSS-REFERENCE TO RELATED APPLICATION

This application is a continuation of U.S. patent application Ser. No. 13/728,669, entitled "FAULT DETECTION IN INSTRUCTION TRANSLATIONS", filed on Dec. 27, 2012, by Nathan Tuck, et al., which is currently pending, is commonly assigned with this application, and incorporated herein by reference in its entirety.

BACKGROUND

Some computing systems implement translation software to translate portions of target instruction set architecture (ISA) instructions into native instructions that may be executed more quickly and efficiently through various optimization techniques such as combining, reorganizing, and eliminating instructions. More particularly, in transactional computing systems that have the capability to speculate and rollback operations, translations may be optimized in ways that potentially violate the semantics of the target ISA. Due to such optimizations, once a translation has been generated, it can be difficult to distinguish whether events (e.g., architectural fault such as a page violation) encountered while executing a translation are architecturally valid or are spuriously created by over-optimization of the translation.

DETAILED DESCRIPTION

The present disclosure provides a mechanism for optimizing native translations of corresponding non-native code portions, such as target instruction set architecture (ISA) code portions. The intelligent generation of translations, and the optimization thereof, may be handled by translation software, which may be included as part of a software layer that provides an interface between an ISA and a processor core. More particularly, the present disclosure provides a fault narrowing mechanism that identifies and replaces code translations that generate spurious fault events (e.g., architectural faults). As discussed above, in some cases, a translation may be aggressively or overly optimized such that the translation generates spurious fault events. Note that "spurious" means that if the corresponding target ISA code or a functional equivalent thereof were executed, then the fault event would not occur. In other cases, a fault event may be generated by the target ISA code. The mechanism determines whether a fault event encountered in a translation is generated spuriously by the translation, for example due to over-optimization of the translation, and if it is determined that the fault event was spuriously caused by the translation, it generates a different translation.

In one example, the translation software redirects execution to an instruction pointer (IP) of a native translation in lieu of corresponding target ISA code by the processor core. The native translation may be executed without using a hardware decoder located on the processor core. Note that when this disclosure refers to execution "without using the hardware decoder," that language may still encompass minor or trivial uses of decode logic in hardware while a translation is being executed. Circumventing the hardware decoder (i.e., by executing a translation) in many cases will improve speed of execution, reduce power consumption, and provide various other benefits. During execution of the native translation, a fault may be encountered. At this point, it is unknown whether the fault is an actual architectural event or if it is an artifact of the way that the code has been optimized in the translation. As such, execution is rolled back to a committed state (e.g., through a checkpoint mechanism), and a different version of code corresponding to the translation that does not produce the artifact event is executed. In one example, the alternate version of the code corresponding to the translation is target ISA code that is decoded by a hardware decoder into native instructions. If the fault is encountered during execution of the alternate code, then it is concluded that the translation itself was not the cause of the fault. If the fault is not encountered during execution of the alternate code, then it is concluded that the translation generated the artifact, and it is determined whether to allow future execution of the native translation or to prevent such future execution in favor of forming and executing one or more alternate native translations. In some embodiments, the translation is reformed in a different way, and the reformed translation is executed subsequently. In one example, the translation is reformed with fewer optimizations so as not to cause the fault during execution.

By using this mechanism, a translation can be aggressively over-optimized, then quickly narrowed if necessary using the hardware decoder to get to a translation that is suitably optimized to be executed without generating fault events. Implementations without this mechanism would find the overhead of narrowing or re-optimizing to be high enough that translations would tend to be overly conservative or under-optimized to avoid the narrowing process. For example, a software interpreter may be adequate to isolate an architectural event or lack thereof, but would be obtrusively slow for narrowing and re-optimizing as the software interpreter can require hundreds of native instructions to emulate a single target ISA instruction.

Figure 1:
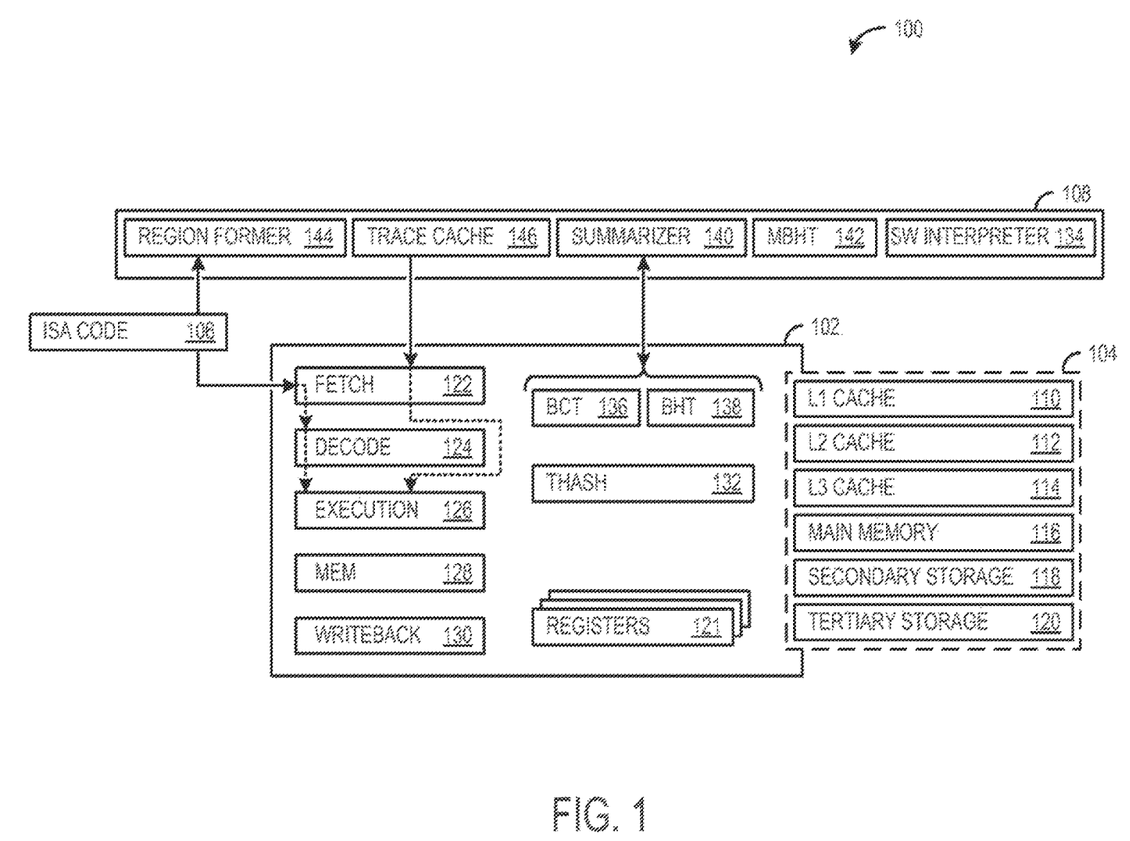
FIG. 1 schematically shows an example computing system in accordance with an embodiment of the present disclosure.

FIG. 1 shows aspects of an example micro-processing and memory system 100 (e.g., a central processing unit or graphics processing unit of a personal computer, game system, smartphone, etc.) including processor core 102. Although the illustrated embodiment includes only one processor core, it will be appreciated that the micro-processing system may include additional processor cores in what may be referred to as a multi-core processing system. Microprocessor core/die 102 variously includes and/or may communicate with various memory and storage locations 104. In some cases, it will be desirable to allocate a portion (sometimes referred to as a "carveout") of memory as secure and private such that it is invisible to the user and/or instruction set architecture (ISA) code 106. Various data and software may run from, and/or be stored in said allocation, such as software layer 108 and related software structures. As will be discussed in greater detail below, the software layer may be configured to generate, optimize, and store translations of ISA code 106, and further to manage and interact with related hardware on core 102 to determine whether translations are suitably optimized (e.g., the translations do not generate faults or other artifacts).

Memory and storage locations 104 may include L1 processor cache 110, L2 processor cache 112, L3 processor cache 114, main memory 116 (e.g., one or more DRAM chips), secondary storage 118 (e.g., magnetic and/or optical storage units) and/or tertiary storage 120 (e.g., a tape farm). Processor core 102 may further include processor registers 121. Some or all of these locations may be memory-mapped, though in some implementations the processor registers may be mapped differently than the other locations, or may be implemented such that they are not memory-mapped. It will be understood that the memory/storage components are listed above in increasing order of access time and capacity, though there are possible exceptions. In some embodiments, a memory controller may be used to handle the protocol and provide the signal interface required of main memory 116, and, typically, to schedule memory accesses. The memory controller may be implemented on the processor die or on a separate die. It is to be understood that the locations set forth above are non-limiting and that other memory/storage locations may be used instead of, or in addition to, those described above without departing from the scope of this disclosure.

Microprocessor 102 includes a processing pipeline which typically includes one or more f fetch logic 122, decode logic 124 (referred to herein as a hardware decoder or hardware decode logic (HWD)), execution logic 126, mem logic 128, and writeback logic 130. Note that one or more of the stages in the processing pipeline may be individually pipelined to include a plurality of stages to perform various associated operations. It should be understood that these five stages are somewhat specific to, and included in, a typical RISC implementation. More generally, a microprocessor may include fetch, decode, and execution logic, with mem and writeback functionality being carried out by the execution logic. The present disclosure is equally applicable to these and other microprocessor implementations, including hybrid implementations that may use VLIW instructions and/or other logic instructions.

Fetch logic 122 retrieves instructions from one or more of memory locations 104 (e.g., unified or dedicated L1 caches backed by L2-L3 caches and main memory). In some examples, instructions may be fetched and executed one at a time, possibly requiring multiple clock cycles.

Microprocessor 102 is configured to execute instructions, via execution logic 126. Such instructions are generally described and defined by an ISA that is native to the processor, which may be generated and/or executed in different modes of operation of the microprocessor. A first mode (referred to herein as the "hardware decoder mode") of execution includes utilizing the HWD 124 to receive and decode (e.g., by parsing opcodes, operands, and addressing modes, etc.) target ISA or non-native instructions of ISA code 106 into native instructions for execution via the execution logic. It will be appreciated that the native instructions dispatched by the HWD may be functionally equivalent to the non-native instructions, in that execution of either type of instructions achieves the same final result or outcome.

A second mode (referred to herein as the "translation mode") of execution includes retrieving and executing native instructions without use of the HWD. A native translation may cover and provide substantially equivalent functionality for any number of portions of corresponding target ISA or non-native ISA code 106. The corresponding native translation is typically optimized to some extent by the translation software relative to the corresponding non-native code that would be dispatched by the HWD. However, it will be understood that a variety of optimizations and levels of optimization may be employed.

A third mode (referred to herein as "software interpretation mode") of execution includes utilizing a software interpreter 134 located in the software layer 108 to execute target ISA code one instruction at a time by translating the target ISA instruction into corresponding native instructions.

Typically, translation mode provides the fastest and most efficient operation out of the above described execution modes. However, there may be substantial overhead costs associated with generating an optimized translation of target ISA instructions. Accordingly, a translation may be generated for portions of target ISA code that are executed frequently or consume substantial processing time, such as frequently used or "hot" loops or functions in order to control such translation overhead. In one example, a translation may be generated for a portion of target ISA code in response to the portion of code being executed a number of times that is greater than a threshold value.

Hardware decoder mode may be slower or less efficient than translation mode and faster or more efficient than software interpretation mode. For example, hardware decoder mode may be used to execute portions of target ISA code that do not have corresponding translations. As another example, hardware decoder mode may be used to determine whether or not a translation is over-optimized based on encountering a fault during execution of a translation as will be discussed in further detail below.

Software interpretation mode may be used in corner cases or other unusual/rare circumstances, such as to isolate a fault or lack of a fault. The software interpretation mode may be used least frequently of the above described modes of operation, because the software interpretation mode may be substantially slower than the other modes of operation. For example, software interpretation mode may require hundreds of native instructions to emulate a single target ISA instruction.

For the sake of clarity, the native instructions output by the HWD in hardware decoder mode will in some cases be referred to as non-translated instructions, to distinguish them from the native translations that are executed in the translation mode without use of the HWD.

Native translations may be generated in a variety of ways. As discussed above, due to the high overhead of generating translations, in some embodiments, code portions of non-native ISA code may be profiled in order to identify whether and how those code portions should be included in new or reformed translations. When operating in hardware decoder mode, the system may dynamically change and update a code portion profile in response to the use of the HWD to execute a portion of non-native ISA code. For example, profiled code portions may be identified and defined by taken branches. This is but one example, however, and any suitable type of code portion associated definition may be used.

In certain embodiments, the code portion profile is stored in an on-core micro-architectural hardware structure (e.g., on core 102), to enable rapid and lightweight profiling of code being processed with the HWD. For example, the system may include a branch count table (BCT) 136 and a branch history table (BHT) 138 each including a plurality of records containing information about code portions of non-native ISA code 106 encountered by the HWD as branch instructions are processed. In general, the BCT tracks the number of times a branch target address is encountered, while the BHT records information about the taken branch when a branch target address is encountered. Furthermore, the BCT is used to trigger profiling for translation upon saturation of a particular code portion. For example, the BCT may be used to determine whether a code portion has been executed a number of times that exceeds a threshold value, which triggers reforming of a corresponding translation.

As the code portions of non-native ISA code are processed by HWD, records may be dynamically added to BCT and BHT. For example, as the HWD processes taken branches leading to a branch target address, a record for that branch target address is added to the BCT and an initial value is inserted into a counter associated with the record. Alternatively, if a record already exists for the target address, the counter is incremented or decremented, as appropriate to the implementation. As such, the system may include micro-architectural logic for adding and updating records in the BCT and the BHT. This logic may be a distinct component or distributed within various components of the processing pipeline, though typically this logic will be operatively coupled closely with the HWD since it is the use of the HWD that results in changes to the BCT and the BHT.

From time to time, the records of BCT and/or BHT may be sampled and processed, for example by a summarizer 140 of software layer 108. As described above, the software layer may reside in a secure/private memory allocation of storage locations 104 that is accessible by microprocessor 102 during execution of native ISA instructions. In other words, such an allocation may be inaccessible by ISA code.

The summarizer may be implemented as a lightweight event handler that is triggered when a record in the BCT produces an event (e.g., the counter for the record saturates). In other words, the BCT produces an event, and the summarizer handles the event (e.g., by sampling and processing records in the BHT). Each counter maintained in the BCT for a target address is used to control how many times the associated code portion will be encountered before an event is taken for that code portion.

The summarizer identifies flow into, out of, and/or between code portions when using the hardware decoder. Furthermore, the summarizer identifies one or more non-translated code portions to be included in a new native translation by producing a summarized representation (e.g., a control flow graph) of code portion control flow involving the HWD. For example, the sampling and processing by the summarizer may be used to generate and update a meta branch history table (MBHT) 142 in and between non-native code portions processed by the HWD. It will be appreciated that information about code portions and control flow may be represented in any suitable manner, data structure, etc. The information in the MBHT is subsequently consumed by a region former 144, which is responsible for forming new translations of non-native ISA code. Once formed, translations may be stored in one or more locations (e.g., a trace cache 146 of software layer 108). The region former may employ various optimization techniques in creating translations, including, but not limited to, reordering instructions, renaming registers, consolidating instructions, removing dead code, unrolling loops, etc. It will be understood that these translations may vary in length and the extent to which they have been optimized. For example, the region former may vary the aggressiveness at which a translation is optimized in order to strike a balance between increasing performance and generating spurious architectural events or artifacts during execution. It will be appreciated that the structures stored in the software layer may be included in or collectively referred to herein as a translation manager or as translation management software.

During operation, the existence of a translation may be determined using an on-core hardware redirector 132 (a.k.a., a TRASH). The hardware redirector is a micro-architectural structure that includes address information or mappings sufficient to allow the processing pipeline to retrieve and execute a translation or a portion thereof associated with a non-native portion of ISA code via address mapping. Specifically, when the processing pipe branches to a target address of a non-native portion of ISA code, the target address is looked up in the TRASH. Over time, translations that are frequently and/or recently requested are indexed by, and incorporated into, the hardware redirector. Each entry in the hardware redirector is associated with a translation, and provides redirection information that enables the microprocessor, during a fetch operation for a selected code portion, to cause execution to be redirected away from that code portion and to its associated translation. In order to save on processor die area and to provide rapid lookups, the hardware redirector may be of limited size, and it is therefore desirable that it be populated with entries providing redirection for the most "valuable" translations (e.g., translations that are more frequently and/or recently used). Accordingly, the hardware redirector may include usage information associated with the entries. This usage information varies in response to the hardware structure being used to redirect execution, and thus the entries are maintained in, or evicted from, the hardware redirector based on this usage information.

In the event of a hit in the TRASH, the lookup returns the address of an associated translation (e.g., translation stored in trace cache 146), which is then executed in translation mode (i.e., without use of HWD 124). Alternatively, in the event of a miss in the TRASH, the portion of code may be executed through a different mode of operation and one or more of the mechanisms described above may be usable to generate a translation. The TRASH lookup may therefore be usable to determine whether to add/update records in BCT and BHT. In particular, a TRASH hit means that there is already a translation for the non-native target code portion, and there is thus no need to profile execution of that portion of target code in hardware decoder mode. Note that the TRASH is merely one example of a mechanism for locating and executing translations, and it will be appreciate that the processor hardware and/or software may include other mechanisms for locating and executing translations without departing from the scope of the present description.

Throughout operation, a state of the microprocessor (e.g., registers 121 and/or other suitable states) may be checkpointed or stored to preserve the state of the microprocessor while a non-checkpointed working state version of the microprocessor speculatively executes instructions. For example, the state of the microprocessor may be checkpointed when execution of an instruction (or bundle, code portion of a translation, etc.) is completed without encountering an architectural event, artifact, exception, fault, etc. For example, an architectural event (e.g., a fault event) may include a page violation, a memory alignment violation, a memory ordering violation, a break point, execution of an illegal instruction, etc. If a fault event is encountered during execution, then the instruction may be rolled back, and state of the microprocessor may be restored to the checkpointed state. Then operation may be adjusted to handle the fault event. For example, the microprocessor may operate in hardware decoder mode and mechanisms for determining whether the encountered event is an artifact of the translation may be employed. In one example, the decode logic is configured to manage checkpointing/rollback/restore operations. Although it will be appreciated that in some embodiments a different logical unit may control such operations. In some embodiments, checkpointing/rollback/restore schemes may be employed in connection with the memory and storage locations 104 in what may be generally referred to as transactional memory. In other words, microprocessor 102 may be a transaction-based system.

Furthermore, during execution of a native translation, the execution logic may be configured to detect occurrence of a fault event in the native translation. Since at the time of encountering the fault event, it may not be known whether or not the fault event is an artifact generated due to a particular way in which the native translation was formed, the translation manager causes the code portion to be executed differently. For example, the target ISA instructions or a functionally equivalent version thereof may be executed without executing the native translation to determine whether the fault event was a product of the native translation.

If a fault event is encountered in the translation, then the translation manager may note the IP boundaries of the translation before execution of the translation is rolled back. In some cases, the IP boundaries may include one contiguous portion of target ISA code. In other cases, the IP boundaries may include multiple non-contiguous portions of target ISA code (e.g., if the translation was formed including a target ISA branch that was assumed to be taken when the translation was generated). The IP boundaries may be used during execution of the target ISA instructions or a functionally equivalent version thereof to determine whether a fault event occurs in the code portion corresponding to the native translation.

In one example, the system may operate in hardware decoder mode to produce a functional equivalent of the target ISA instructions. In particular, the HWD receives target ISA instructions starting at the IP boundary corresponding to the beginning of the native translation, decodes them into native instructions, and dispatches the native instruction to the execution logic for execution. The native instructions may be executed by the execution logic until the fault event is encountered again, or execution leaves the code portion corresponding to the native translation (e.g., the IP is beyond the IP boundary corresponding to the end of the translation). Various mechanisms for determining whether execution has left the code portion corresponding to the native translation may be employed during operation in hardware decoder mode. Several non-limiting examples of such mechanisms are discussed in further detail below with reference to FIGS. 2 and 3.

If the event is encountered during execution of the target ISA instruction or their functional equivalent (e.g., in the hardware decoder mode), it can be assumed that the event is an architectural fault that was not created by the translation, and redirection of control flow to the architectural exception vector is performed where control is passed to the translation manager or other architectural event handling logic to correct the architectural event or provide other event handling operations.

If execution leaves the translation without encountering the fault event, then it can be assumed that the native translation spuriously caused the fault event. In other words, the translation manager determines that the fault event is not replicated during execution of the target ISA instructions or the functionally equivalent version thereof. In response to determining that the fault event is not replicated, the translation manager is configured determine whether to allow future execution of the native translation or to prevent such future execution in favor of forming and executing one or more alternate native translations. Note that a future execution of the native translation may include any execution subsequent to determining that the native translation spuriously caused the fault event. The native translation may be prevented from being executed in order to reduce the likelihood of the fault event from occurring during subsequent executions of the target ISA instructions or the functionally equivalent version thereof. In some embodiments, the determination whether to allow future execution of the native translation or to prevent such future execution may include forming and executing the one or more alternate translations upon determining that a performance cost associated with forming the one or more alternate translations is less than a performance cost associated with continuing to execute the first native translation, executing the target ISA instructions or a functionally equivalent version thereof, without executing the first native translation, or a combination thereof. It will be appreciated that the performance costs may be calculated in any suitable manner without departing from the scope of the present disclosure.

In some embodiments, the native translation may be prevented from being executed immediately after determining that the native translation spuriously caused the fault event such that the translation is not executed again. For example, when the code portion corresponding to the native translation is encountered subsequent to the determination, the system may operate in hardware decoder mode to execute the code portion instead of executing the native translation. As another example, a different translation may be executed instead of the native translation.

In some embodiments, the native translation may be executed one or more times subsequent to the determination before the native translation is prevented from being executed. For example, the native translation may be executed subsequently in order to determine if the native translation spuriously causes any different faults. In one particular example, the native translation is not prevented from being executed until a first fault and a second fault are encountered a designated number of times as a result of executing the native translation. In other words, the native translation may be repeatedly executed until it can be assumed with a level of confidence that the native translation is the cause of a number of different faults before execution of the native translation is prevented.

In some cases, the system may operate in software interpreter mode instead of hardware decoder mode in response to encountering a fault event during execution of the native translation (e.g., to handle of corner cases). As discussed above, hardware decoder mode may be preferred over software interpreter mode for fault narrowing operation because the software interpreter mode may be significantly slower to execute the target ISA instructions. For example, the software interpreter may take over one hundred times longer to execute an instruction than the HWD may take to execute the same instruction.

In some embodiments, the translation manager may be configured to generate an updated or reformed translation of the target ISA instructions that is optimized differently based on encountering an artifact or fault event in the first translation. In one example, the reformed translation is optimized differently so as not to generate the architectural event. For example, the updated translation may include fewer optimizations than the previous translation, such as less combinations, reorganizations, and/or eliminations of target ISA instructions. Further, the execution logic may be configured to, upon subsequently encountering the code portion of the target ISA instructions, execute the updated or reformed translation instead of the previous translation that spuriously caused the fault event.

Since there may be substantial overhead costs associated with generating an optimized translation of target ISA instructions, in some embodiments, the translation manager may be configured to track activity related to the translation subsequent to determining that the fault was an artifact of the translation, and determine if or when it would be suitable to update the translation. In one example, the translation manager is configured to increment a counter associated with the native translation subsequent to determining that the fault event is an artifact of the translation. Further, the translation manager may generate the updated translation of the target ISA instructions responsive to the counter saturating or becoming greater than a threshold value. The counter may be employed to track or count a variety of different factors, events, parameters, or execution properties associated with the translation that spuriously caused the fault event. Non-limiting examples of these factors that the counter may track include time, a number of translation executions, a number of translation executions that spuriously cause a fault event, a number of translation execution that spuriously cause a number of different fault events. In some embodiments the counter may include a decision function that includes a combination of these factors.

It will be appreciated that the counter may be used to track any suitable parameter or event associated with the translation in order to determine if or when to reform the translation. Moreover, it will be appreciated that the counter is merely one example of a tracking mechanism, and any suitable mechanism may be employed to decide when to reform the translation.

In some embodiments, the translation manager may be configured to reform the translation (or generate a new translation) of only a subset of the target ISA instructions that were represented by the translation that spuriously created the fault. In some embodiments, the translation manager may be configured to generate a plurality of translations that span the target ISA instructions that were represented by the translation that spuriously created the fault.

Figure 2:
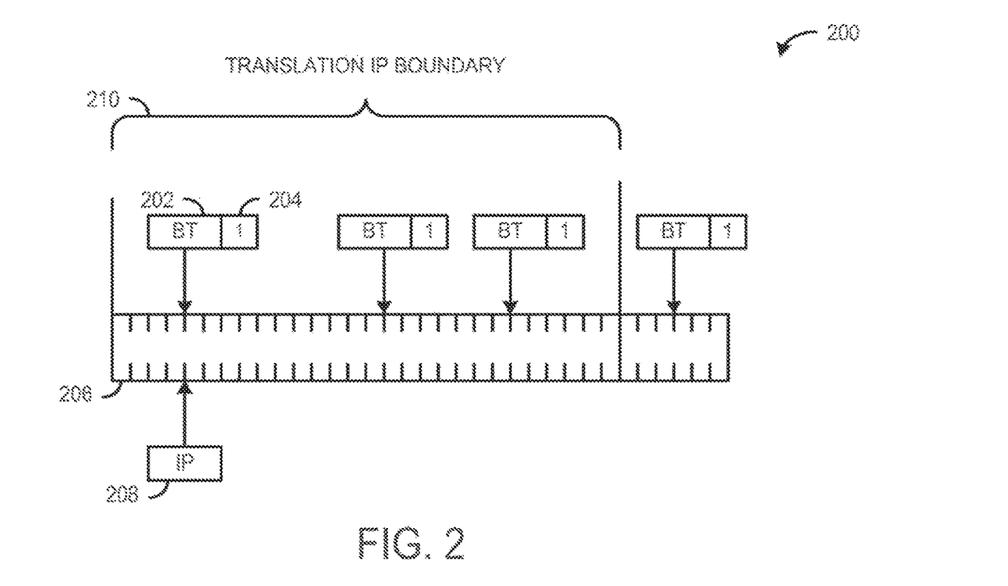
FIG. 2 shows an example of a trap mechanism for pausing execution in order to determine whether a fault event is spuriously created by a translation.
Figure 3:
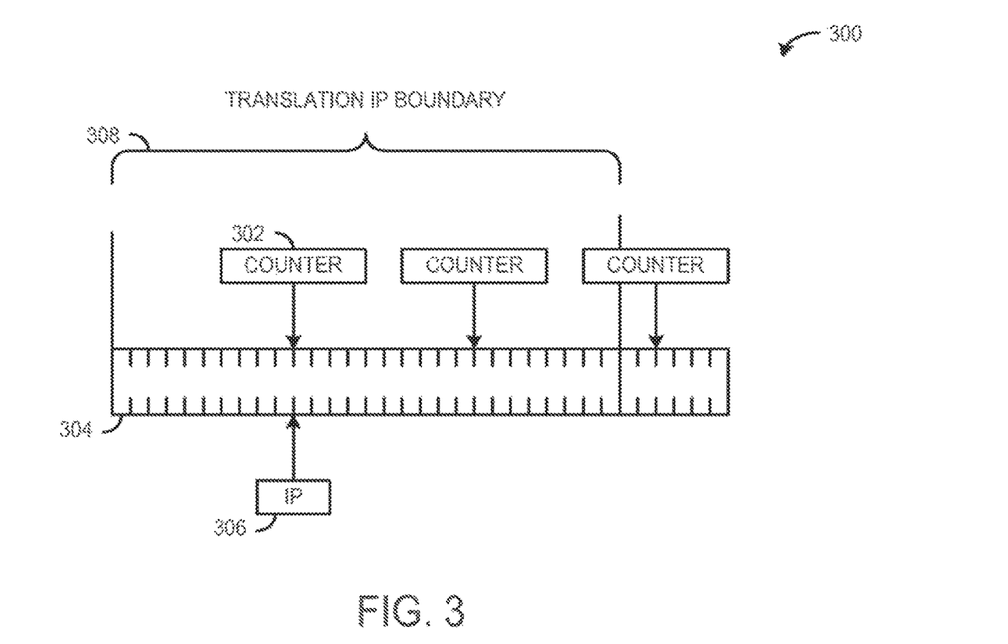
FIG. 3 shows an example of a counter mechanism for pausing execution in order determine whether a fault event is spuriously created by a translation.

FIGS. 2 and 3 show examples of various mechanisms that may be employed to pause execution during operation in hardware decoder mode in order to determine whether the code portion corresponding to the translation is executed without encountering the event, which may be used to determine whether an event is spuriously created by the translation. FIG. 2 shows an example of a mechanism 200 that causes execution to be paused responsive to encountering a target of a branch instruction that is dispatched by the HWD. In particular, when an event is encountered in translation mode, execution is rolled back to the beginning of the IP boundary 210 of the translation. The IP boundary defines the code region of the translation by denoting the IP at the beginning of the translation and the IP at the end of the translation. The translation manager calls the HWD to operate in hardware decoder mode with a particular jump instruction that includes a "sticky bit" 202 that is set based on encountering the event. By setting the sticky bit in the jump instruction that invokes the HWD, each branch causes a field 204 to be set that is associated with the branch target.

The set bit is recognized upon execution of the branch target causing execution in hardware decoder mode to be paused. The set bit is cleared and control is passed from the HWD to the translation manager. The translation manager determines whether the IP is within the IP boundary of the code portion corresponding to the translation. If the IP is beyond the IP boundary of the translation, then the event was not encountered in the code portion at issue and it can be assumed that the event was an artifact of the translation, and the translation may need to be reformed in a different manner and the sticky bit is cleared. If the IP is within the IP boundary of the translation, then control is passed back to the HWD and execution in hardware decoder mode continues until another branch target having a set bit is encountered or the event is encountered. If the event is encountered, then it can be assumed that the event is not an artifact of the translation and the translation may not be over-optimized and the sticky bit is cleared.

The above described mechanism may be referred to as a "branch callback trap" because each time a branch target is encountered with a set bit, execution in hardware decoder mode is paused and control is passed to the translation manager. In other words, the sticky bit is the mechanism by which the translation manager gets passed control from hardware decoder mode. Note that when the HWD is called for operation other than when an event is encountered, the sticky bit in the jump instruction may be cleared to suppress the branch callback trap mechanism.

In some microprocessor implementations that include a hardware redirector or TRASH that is accessed by the HWD to check for a translation, access to the TRASH by the HWD is disabled or matches in the TRASH are inhibited based on the event being encountered. In one example, access to the TRASH is disabled when the sticky bit in the jump instruction that calls the HWD is set. By suppressing the lookup of the TRASH, execution is not redirected to the translation so that execution in hardware decoder mode may be performed to determine whether the event is generated by the translation. In other words, access to the TRASH is disabled when executing the target ISA instructions without executing the native translation.

FIG. 3 shows an example of a counter mechanism 300 that causes execution to be paused responsive to a counter expiring or elapsing. Similar to the above described example, when the HWD is called based on encountering an event during operation in translation mode, a counter 302 may be set, for example by setting a bit in a particular jump instruction that calls the HWD. During execution in hardware decoder mode, the counter counts down and when the counter expires execution is paused and control is passed to the translation manager. The translation manager determines whether the IP 306 is within the IP boundary 308 of the code portion corresponding to the translation. If the IP is beyond the IP boundary of the translation, then the event was not encountered in the code portion at issue and it can be assumed that the event was an artifact of the translation, and the translation may need to be reformed in a different manner. If the IP is within the IP boundary of the translation, then control is passed back to the HWD and execution in hardware decoder mode continues until the counter expires again or the event is encountered. If the event is encountered, then it can be assumed that the event is not an artifact of the translation and the translation may not be over-optimized.

It will be appreciated that the counter may be set to any suitable duration or may track any suitable execution property or parameter. In one example, the counter may be set to for a designated number of clock cycles. In another example, the counter may be set for a designated number of instructions. In yet another example, the counter may expire in response to encountering a branch instruction. In still yet another example, the counter may expire in response to encountering a designated number of branch instructions.

It will be appreciated that the above described mechanisms may be particularly applicable to operation in hardware decoder mode, because control is passed from hardware (e.g., execution logic) to software (e.g., translation manager) when execution is paused to determine whether execution has left the IP boundary of the code portion at issue. Moreover, such mechanisms may allow for execution to be paused occasionally in order to perform an IP boundary check that allows for faster execution relative to an approach that checks after execution of each instruction.

Figure 4:
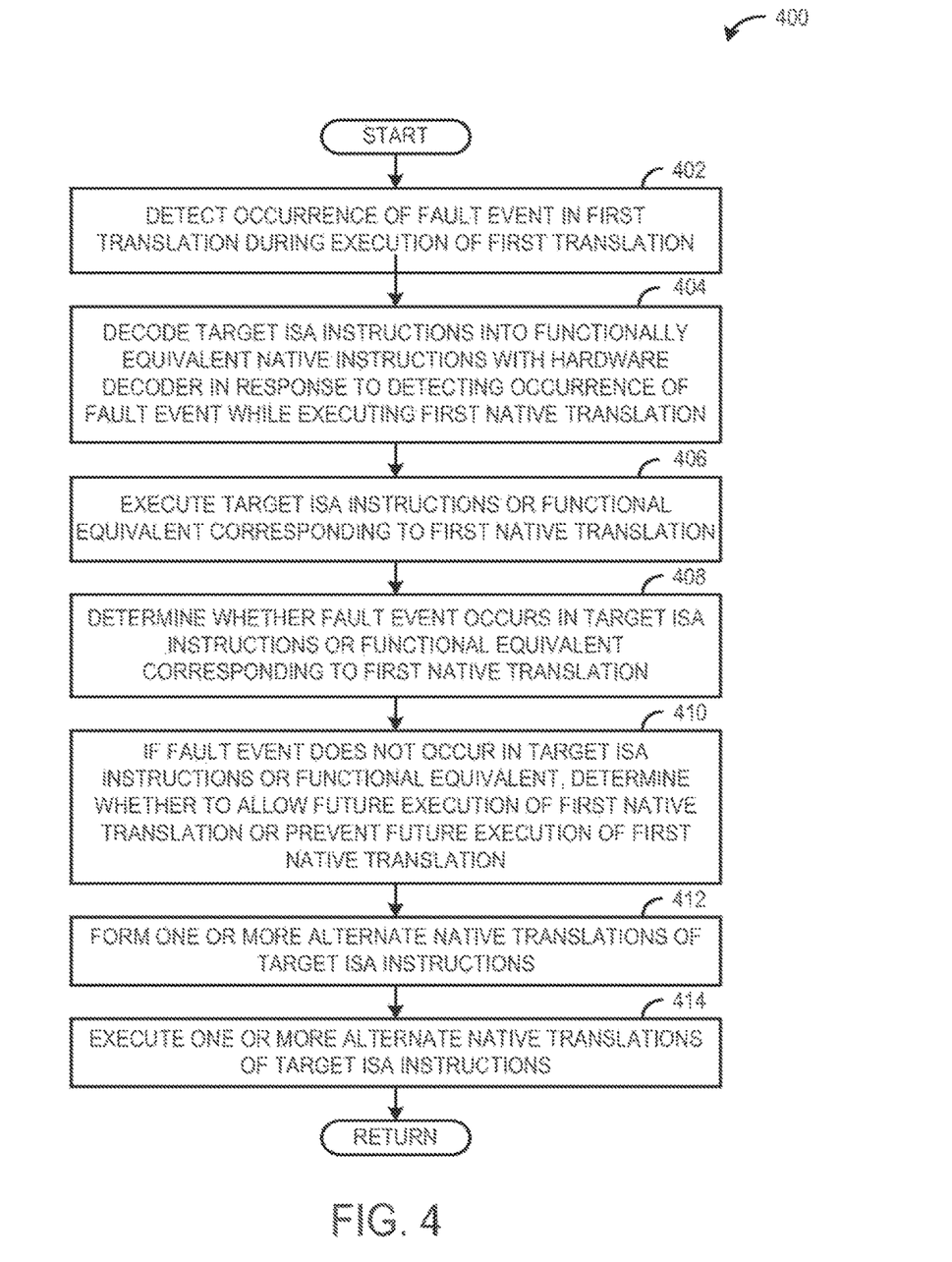
FIG. 4 shows an example of a method for identifying and replacing code translations that generate spurious fault events in accordance with an embodiment of the present disclosure.

FIG. 4 shows an example of a method 400 for optimizing a translation of target ISA instructions in accordance with an embodiment of the present disclosure. The method 400 may be implemented with any suitable software/hardware, including configurations other than those shown in the foregoing examples. In some cases, however, the process flows may reference components and processes that have already been described. For purposes of clarity and minimizing repetition, it may be assumed that these components/processes are similar to the previously described examples.

At 402, the method 400 includes, detecting, while executing a first native translation of target ISA instructions, occurrence of a fault event in the first native translation. The first native translation may be executable to achieve substantially equivalent functionality as obtainable via execution of the target ISA instructions. In other words, the first native translation is designed such that execution of the first native translation should produce the same output as the target ISA instructions. In one example, the fault event includes one of a page violation, a memory alignment violation, a memory ordering violation, a break point, and execution of an illegal instruction.

At 404, the method 400 includes decoding the target ISA instructions into functionally equivalent native instructions with a hardware decoder in response to detecting occurrence of the fault event while executing the first native translation;

At 406, the method 400 includes executing the target ISA instructions or a functionally equivalent version thereof, where such execution is performed without executing the first native translation.

At 408, the method 400 includes determining whether occurrence of the fault event is replicated while executing the target ISA instructions or the functionally equivalent version thereof.

At 410, the method 400 includes in response to determining that the fault event is not replicated, determining whether to allow future execution of the first native translation or to prevent such future execution in favor of forming and executing one or more alternate native translations.

At 412, the method 400 may optionally include in response to determining that the fault event is not replicated, forming one or more alternate native translations of the target ISA instructions. The one or more alternate native translations may be executable to achieve substantially equivalent functionality as obtainable via execution of the target ISA instructions. In some cases, the one or more alternative native translations are optimized differently than the first native translation so as to avoid occurrence of the fault event that was encountered during execution of the first native translation. In some cases, the one or more alternative native translations may include fewer optimizations than employed in the first native translation At 414, the method 400 may optionally include executing the one or more alternate native translations upon subsequently encountering the target ISA instructions.

While the depicted method may be performed in connection with any suitable hardware configuration, it will be appreciated that modifications, additions, omissions, and refinements may be made to these steps in accordance with method descriptions included above and described with references to the mechanisms, hardware, and systems shown in FIG. 1-3.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

What is claimed is:

1. A method comprising:
    performing a first translation of a target instruction to form a first set of native instructions;
    executing the first set of native instructions;
    detecting a fault occurrence in the execution of the first set of native instructions;
    performing a second translation of the target instruction to form a second set of native instructions in response to the detection of the fault occurrence, wherein the second set of native instructions is not the same as the first set of native instructions;
    executing the second set of native instructions;
    detecting a fault absence in the execution of the second set of native instructions;
    determining, based on the fault occurrence in the first set of native instructions and the fault absence in the second set of native instructions, that the fault occurrence is attributed to the first translation;
    incrementing a counter associated with the first set of native instructions as a consequence of the determining that the fault occurrence is attributed to the first translation;
    determining whether or not to prevent further execution of the first set of native instructions as a function of a value of the counter;
    performing a third translation of the target instruction to form a third set of native instructions in response to the determination that the fault occurrence is attributed to the first translation and when the further execution of the first set of native instructions is prevented, wherein the third set of native instructions is not the same as the second set of native instructions, and the third set of native instructions is not the same as the first set of native instructions; and
    executing the third set of native instructions.

2. The method of claim 1, wherein a hardware decoder is utilized to perform the second translation.

3. The method of claim 2, wherein software is utilized to perform the first translation.

4. The method of claim 3, wherein software is utilized to perform the third translation.

5. The method of claim 1, further comprising:
    saving a state of a microprocessor prior to the microprocessor executing the first set of native instructions; and restoring the microprocessor to the saved state after the detection of the fault occurrence.

6. The method of claim 1, further comprising:

pausing execution of the second set of native instructions in response to encountering a target of a branch instruction; and detecting the fault absence based on an instruction pointer being beyond an instruction pointer boundary when the execution of the second set of native instructions is paused.

7. The method of claim 1, further comprising wherein the third set of native instructions is an alternate to the first set of native instructions.

8. The method of claim 1, further comprising wherein the third translation spans the target ISA instruction that was employed by the first translation.

9. A system comprising:

a memory configured to store a target instruction; and a microprocessor, wherein the system is configured to:

perform a first translation of the target instruction to form a first set of native instructions;

execute the first set of native instructions;

detect a fault occurrence in the execution of the first set of native instructions;

perform a second translation of the target instruction to form a second set of native instructions in response to the detection of the fault occurrence, wherein the second set of native instructions is not the same as the first set of native instructions;

execute the second set of native instructions;

detect a fault absence in the execution of the second set of native instructions;

determine, based on the fault occurrence in the first set of native instructions and the fault absence in the second set of native instructions, that the fault occurrence is attributed to the first translation;

increment a counter associated with the first set of native instructions as a consequence of the determining that the fault occurrence is attributed to the first translation;

determine whether or not to prevent further execution of the first set of native instructions as a function of a value of the counter;

perform a third translation of the target instruction to form a third set of native instructions in response to the determination that the fault occurrence is attributed to the first translation and when the further execution of the first set of native instructions is prevented, wherein the third set of native instructions is not the same as the second set of native instructions, and the third set of native instructions is not the same as the first set of native instructions; and execute the third set of native instructions.

10. The system of claim 9, wherein the system is further configured to:

utilize a hardware decoder of the microprocessor to perform the second translation.

11. The system of claim 10, wherein the system includes software stored in the memory, and the system is further configured to:

utilize the software to perform the first translation.

12. The system of claim 11, wherein the system is further configured to:

utilize the software to perform the third translation.

13. The system of claim 9, wherein the system is further configured to:

save a state of the microprocessor prior to the execution of the first set of native instructions; and restore the microprocessor to the saved state after the detection of the fault occurrence.

14. The system of claim 9, wherein the system is further configured to:

pause execution of the second set of native instructions in response to the microprocessor encountering a target of a branch instruction; and detect the fault absence based on an instruction pointer of the microprocessor being beyond an instruction pointer boundary when the execution of the second set of native instructions is paused.

15. The system of claim 14, further comprising wherein the third set of native instructions is an alternate to the first set of native instructions.

16. The system of claim 14, further comprising wherein the third translation spans the target ISA instruction that was employed by the first translation.

* * * * *